United States Patent
Kang et al.

(10) Patent No.: US 10,469,293 B2
(45) Date of Patent: Nov. 5, 2019

(54) FTN-BASED OFDM TRANSMISSION APPARATUS AND METHOD FOR EFFICIENT COEXISTENCE OF BROADBAND AND SPORADIC TRAFFICS

(71) Applicant: KOREA UNIVERSITY RESEARCH AND BUSINESS FOUNDATION, Seoul (KR)

(72) Inventors: Chung Gu Kang, Seoul (KR); Ameha Tsegaye Abebe, Seoul (KR)

(73) Assignee: KOREA UNIVERSITY RESEARCH AND BUSINESS FOUNDATION, Seoul (KR)

( * ) Notice: Subject to any disclaimer, the term of this patent is extended or adjusted under 35 U.S.C. 154(b) by 0 days.

(21) Appl. No.: 16/207,549

(22) Filed: Dec. 3, 2018

(65) Prior Publication Data

US 2019/0215197 A1    Jul. 11, 2019

(30) Foreign Application Priority Data

Dec. 1, 2017    (KR) ........................ 10-2017-0164301

(51) Int. Cl.
| | |
|---|---|
| *H04L 27/26* | (2006.01) |
| *H04L 25/03* | (2006.01) |
| *H04L 27/01* | (2006.01) |
| *H04B 7/0413* | (2017.01) |
| *H04L 5/00* | (2006.01) |

(52) U.S. Cl.
CPC ..... *H04L 25/03343* (2013.01); *H04B 7/0413* (2013.01); *H04L 27/01* (2013.01); *H04L 5/0007* (2013.01); *H04L 2025/03426* (2013.01); *H04L 2025/03433* (2013.01)

(58) Field of Classification Search
CPC ............... H04L 25/03343; H04L 27/01; H04L 2025/03426; H04L 2025/03433; H04L 5/0007; H04B 7/0413
USPC .................................................. 375/229, 260
See application file for complete search history.

(56) References Cited

U.S. PATENT DOCUMENTS

| | | | |
|---|---|---|---|
| 2018/0167182 A1* | 6/2018 | Cao ...................... | H04L 5/0007 |
| 2018/0242304 A1* | 8/2018 | Rong ................ | H04W 28/0247 |
| 2018/0270820 A1* | 9/2018 | Gupta ..................... | H04W 4/70 |
| 2018/0295653 A1* | 10/2018 | Ashraf .................... | H04W 4/00 |
| 2018/0324816 A1* | 11/2018 | Islam .................... | H04L 5/0048 |

* cited by examiner

*Primary Examiner* — Don N Vo
(74) *Attorney, Agent, or Firm* — Hauptman Ham, LLP (57) ABSTRACT

Provided are FTN-based OFDM transmission apparatus and method for efficient coexistence of broadband and sporadic traffics which may share radio resources with a Nyquist rate or more of efficiency by inserting the sporadic traffic into resources allocated to the broadband traffic in uplink transmission of a mobile communication system and use the band multiplexing even to a multi input multi output (MIMO) transmission apparatus. According to the present invention, it is possible to reduce quality deterioration according to actual offloading of subcarriers by removing some frequency components to remove a frequency domain allocated with some subcarriers among frequency components of the broadband traffic to selectively offload subcarriers having low contribution rate for the actual broadband transmission and to use the sporadic traffic in a grant-free access scheme by using bands used for the offloaded subcarriers in the sporadic traffic transmission.

16 Claims, 11 Drawing Sheets

FIG. 3 initialize: $\bar{\mathcal{K}}_\ell^{(t)} = \emptyset$, $\mathcal{K}_\ell^{(t)} = \{(\ell-1)L+1, (\ell-1)L+2, \cdots, \ell L\}$, $\ell = 1, 2, \cdots, N/L$ do for all $\ell$: $k_{min} = \arg \min_{k \in \mathcal{K}_\ell^{(t)}, k \notin \bar{\mathcal{K}}_\ell^{(t)}} trace(\mathbf{H}_{b,k}(\mathbf{H}_{b,k})^H)$, $\bar{\mathcal{K}}_\ell^{(t)} \leftarrow \bar{\mathcal{K}}_\ell^{(t)} \cup \{k_{min}\}$ while: $\sum_{t=1}^{n_t} \sum_{\ell=1}^{L} |\bar{\mathcal{K}}_\ell^{(t)}| \leq N_{GF}$

FIG. 4

FIG. 5 initialize: $\bar{\mathcal{K}}_\ell^{(t)} = \emptyset$, $\mathcal{K}_\ell^{(t)} = \{(\ell-1)L+1, (\ell-1)L+2, \cdots, \ell L\}$, $\ell = 1, 2, \cdots, N/L$ channel decomposition: $\mathbf{H}_{b,k} = \mathbf{U}_b^{(k)} \mathbf{\Lambda}_b^{(k)} \mathbf{V}_b^{(k)}{}^*$ for $k = 1, 2, \cdots, N$ do for all $\ell$: $k_{min} = \arg\min_{k \in \mathcal{K}_\ell, k \notin \bar{\mathcal{K}}} \lambda_b^{(k)}$ for $\lambda_b^{(k)} = \min_i \Lambda_b^{(k)}(i,i)$ $\bar{\mathcal{K}}_\ell^{(t)} \leftarrow \bar{\mathcal{K}}_\ell^{(t)} \cup \{k_{min}\}$ while: $\sum_{t=1}^{n_t} \sum_{\ell=1}^{L} |\bar{\mathcal{K}}_\ell^{(t)}| \leq N_{GF}$

| Parameter | Value | Parameter | Value |
|---|---|---|---|
| $N$ | 256 | $n_t$ | 8 |
| $N_{GF}$ | 0-80 | $n_r$ | 8 |
| $B$ | 64 | $L$ | 32 |
| Modulation | 4-QAM | # of repetition | 1000 |
| $E_b/N_o$ dB | 0:20 | $I_d$ | 3 |

FTN-BASED OFDM TRANSMISSION APPARATUS AND METHOD FOR EFFICIENT COEXISTENCE OF BROADBAND AND SPORADIC TRAFFICS

CROSS-REFERENCE TO RELATED APPLICATIONS

This application claims the priority of Korean Patent Application No. 10-2017-0164301 filed on Dec. 1, 2017, in the Korean Intellectual Property Office, the disclosure of which is incorporated herein by reference.

BACKGROUND OF THE INVENTION

Field of the Invention

The present invention relates to faster-than-Nyquist (FTN)-based orthogonal frequency division multiplexing (OFDM) transmission apparatus and method for efficient coexistence of broadband and sporadic traffics, and more particularly, to FTN-based OFDM transmission apparatus and method for efficient coexistence of broadband and sporadic traffics which maintains performance of a broadband traffic user while allowing physical resources allocated to a broadband traffic to use a sporadic traffic so as to share radio resources with a Nyquist rate or more of band efficiency and use band multiplexing even in a multi input multi output (MIMO) transmission apparatus.

Description of the Related Art

For an Internet of Things (IoT) service, wireless networks supporting M2M communication are expected to be used in various ways, and to this end, a technology for efficiently using limited radio resources have been variously studied.

The communication traffic according to the IoT service has a limitation in the transmission delay compared to the general broadband communication traffic, and has a characteristic of requiring sporadic transmission only when necessary. Considering the sporadic characteristic, inefficiency occurs when a separate resource is constantly allocated at all times, and delay time occurs when uplink resource allocation is required separately whenever necessary.

In order to solve such a problem, a grant-free access scheme is considered which can be transmitted at any time without being allocated a separate resource when necessary in accordance with the characteristics of sporadic traffic used in M2M communication such as IoT.

However, as such, there is not yet a clear solution for a specific method of efficiently coexisting the broadband traffic and the grant-free sporadic traffic in the uplink.

SUMMARY OF THE INVENTION

An object of the present invention to solve the problems is to provide FTN-based orthogonal frequency division multiplexing (OFDM) transmission apparatus and method for efficient coexistence of broadband and sporadic traffics so as to minimize reduction in transmission performance of a broadband traffic while being superposed and transmitted to the broadband traffic transmission so that an access delay time of the sporadic traffic does not occur when the broadband traffic and the sporadic traffic coexist in an uplink of a mobile communication system.

Particularly, another object of the present invention is to provide FTN-based OFDM transmission apparatus and method for efficient coexistence of broadband and sporadic traffics so as to minimize quality deterioration of a broadband traffic while using a sporadic traffic in a grant-free access scheme by removing some frequency components of frequency components of the broadband traffic using a faster-than-Nyquist (FTN) concept in which a signal in a time domain is converted into a frequency domain and then a bandwidth occupied by the signal is smaller than a Nyquist bandwidth and allocating the removed frequency components to the traffic transmission.

Furthermore, yet another object of the present invention is to provide FTN-based OFDM transmission apparatus and method for efficient coexistence of broadband and sporadic traffics so as to extend the degree of freedom of multiplexing by extending such a concept to multi input multi output (MIMO) and removing a frequency component for each antenna in a spatial multiplexing process.

According to an embodiment of the present invention, there is provided a FTN-based OFDM transmission apparatus for efficient coexistence of broadband and sporadic traffics including: a broadband user terminal configured to selectively offload subcarriers to be allocated to the sporadic traffic having the same structure as the broadband traffic among subcarriers used for broadband traffic transmission in a frequency domain according to a faster-than-Nyquist (FTN) concept in an uplink in a mobile communication system and then not use the offloaded subcarriers for the broadband traffic transmission; a grant-free user terminal configured to map a subcarrier band to be used for sporadic traffic transmission to the subcarriers offloaded by broadband user terminal and transmit the sporadic traffic in a grant-free access method; and a communication controller configured to receive information about the selectively offloaded subcarrier from the broadband user terminal to provide the received information to the grant-free user terminal.

The communication controller may include a sporadic traffic managing unit which provides the number of subcarriers to be offloaded according to an amount of sporadic traffic by the grant-free user terminals to the broadband user terminal and receives information about the selectively offloaded subcarriers corresponding to the number from the broadband user terminal to provide the received information to the grant-free user terminal.

The broadband user terminal may include a subcarrier offloading unit configured to preferentially offload subcarriers having the lowest contribution to the broadband transmission among the subcarriers allocated to the broadband traffic transmission in order to offload subcarriers to be allocated to the sporadic traffic.

The subcarrier offloading unit may divide subcarriers to be used for the broadband traffic transmission into a plurality of subsets, and repeat a process of selecting and preferentially offloading a subcarrier obtaining a minimum channel gain or having the smallest unique channel gain to reach a predetermined subcarrier offloading number. The subcarrier offloading unit may allow the subcarriers to be offloaded at minimum intervals so the subcarriers to be offloaded are not adjacent to each other.

The subcarrier offloading unit may divide subcarriers to be used for the broadband traffic transmission into a plurality of subsets, perform singular value decomposition for the given channel, and then repeat a process of offloading subcarriers collecting information about the offloaded subcarriers in all subsets until the number of offloaded subcarriers reaches a desired number while performing the process of offloading the subcarriers having the smallest unique channel gain from each subset, and provide information about the offloaded subcarriers collected through the process to the communication controller.

The broadband user terminal may include a multi input multi output (MIMO) type transmitter and configure a subcarrier offloading unit for each antenna when performing spatial multiplexing for multiple antennas to selectively offload the subcarrier for each antenna.

The broadband user terminal or the communication controller which performs broadband communication with the broadband user terminal may include a receiver applied with a frequency-domain equalizer (FDE) detecting symbols of the broadband traffic user terminal for receiving the broadband traffic transmitted by the FTN method in which some subcarriers are offloaded or an SISO equalizer calculating a log-likelihood ratio (LLR) by each symbol bit unit.

According to another embodiment of the present invention, there is provided a FTN-based OFDM transmission method for efficient coexistence of broadband and sporadic traffics including: a subcarrier offloading step of selectively offload subcarriers to be allocated to the sporadic traffic having the same structure as the broadband traffic among subcarriers used for broadband traffic transmission in a frequency domain according to a faster-than-Nyquist (FTN) concept in a mobile communication system and then not use the offloaded subcarriers for the broadband traffic transmission by means of a broadband user terminal; mapping a subcarrier band to be used for sporadic traffic transmission to the subcarriers offloaded by broadband user terminal and transmitting the sporadic traffic in a grant-free access method by means of a grant-free user terminal; and receiving information about the subcarrier selectively offloaded from the broadband user terminal to provide the received information to the grant-free user terminal by means of a communication controller.

According to the embodiment of the present invention, in the FTN-based orthogonal frequency division multiplexing (OFDM) transmission apparatus and method for efficient coexistence of broadband and sporadic traffics, it is possible to maximize the utilization of communication resources by applying a faster-than-Nyquist (FTN) concept while being superposed and transmitted to the broadband traffic transmission so that an access delay time of the sporadic traffic does not occur when the broadband traffic and the sporadic traffic coexist to minimize reduction in transmission performance of the broadband traffic and power consumption.

Particularly, it is possible to reduce quality deterioration according to actual offloading of subcarriers by converting a time domain signal into a frequency domain and removing some frequency components to remove a frequency domain allocated with some subcarriers among frequency components of the broadband traffic using a FTN concept in which a bandwidth occupied by the time domain signal is smaller than a Nyquist bandwidth and selectively offloading subcarriers having low contribution rate for the actual broadband transmission, and to use the sporadic traffic in a grant-free access scheme by using bands used for the offloaded subcarriers in the sporadic traffic transmission.

Furthermore, it is possible to extend the degree of freedom of multiplexing by extending the concept of selectively offloading the subcarriers and mapping the sporadic traffic in the multi input multi output (MIMO) scheme to offload subcarriers for each antenna in a spatial multiplexing process.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

It is noted that technical terms used in the present invention are used to just describe a specific embodiment and do not intend to limit the present invention. Further, unless the technical terms used in the present invention are particularly defined as other meanings in the present invention, the technical terms should be appreciated as meanings generally appreciated by those skilled in the art and should not be appreciated as excessively comprehensive meanings or excessively reduced meanings. Further, when the technical term used in the present invention is a wrong technical term that cannot accurately express the spirit of the present invention, the technical term is substituted by a technical term which can correctly appreciated by those skilled in the art to be appreciated. In addition, general terms used in the present invention should be analyzed as defined in a dictionary or according to front and back contexts and should not be analyzed as an excessively reduced meaning.

Moreover, if singular expression used in the present invention is not apparently different on a context, the singular expression includes a plural expression. Further, in the present invention, it should not analyzed that a term such as "comprising" or "including" particularly includes various components or various steps disclosed in the specification and some component or some steps among them may not included or additional components or steps may be further included.

In addition, terms including ordinal numbers, such as 'first' and 'second' used in the present invention can be used to describe various components, but the components should not be limited by the terms. The terms are used only for distinguishing one component from the other component. For example, a first component may be named as a second component and similarly, the second component may also be named as the first component without departing from the scope of the present invention.

Hereinafter, preferred embodiments according to the present invention will be described in detail with reference to the accompanying drawings, and like or similar components are denoted by the same reference numerals regardless of a sign of the drawing, and duplicated description thereof will be omitted.

In describing the present invention, when it is determined that detailed description relating to well-known functions or configurations may make the subject matter of the present disclosure unnecessarily ambiguous, the detailed description will be omitted. Further, it is noted that the accompanying drawings are used just for easily appreciating the spirit of the present invention and it should not be analyzed that the spirit of the present invention is limited by the accompanying drawings.

Further, all devices and components for explaining the present invention may include various electronic circuits, semiconductors, lines, radiators, power sources, and a control unit for controlling them, which may be implemented by mechanical elements and electrical elements. The control unit may include a RAM, a ROM, a CPU, a GPU, and a bus, and the RAM, the ROM, the CPU, the GPU, and the like may be connected to each other via a bus. The CPU accesses various types of storage units (including various types of physical storage devices including a RAM, a ROM, a HDD, a SDD, a flash memory and the like and virtual storage devices such as the cloud) to perform booting using an O/S stored in the storage units and may perform operations for the embodiment of the present invention to be described below using various kinds of programs, contents, data, and the like stored in the storage unit.

Hereinafter, detailed embodiments of the present invention will be described with reference to the drawings.

Figure 1:
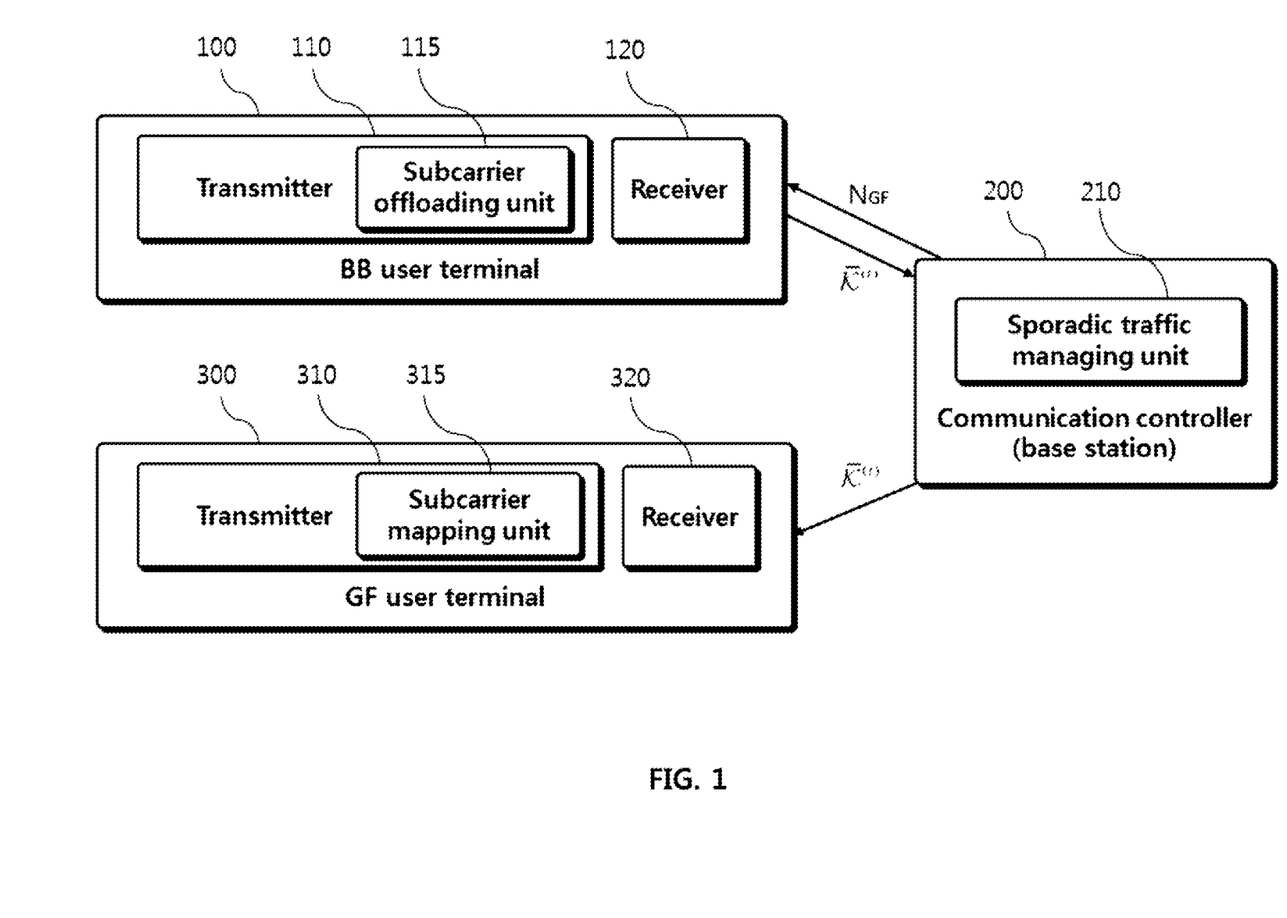
FIG. 1 is a block diagram illustrating a configuration of an FTN-based OFDM transmission apparatus for efficient coexistence of broadband and sporadic traffics according to an embodiment of the present invention.

FIG. 1 is a block diagram illustrating a configuration of an FTN-based orthogonal frequency division multiplexing (OFDM) transmission apparatus for efficient coexistence of broadband and sporadic traffics according to an embodiment of the present invention.

As illustrated in FIG. 1, the FTN-based OFDM transmission apparatus is configured to include a broadband user terminal 100 in which subcarriers allocated to a sporadic traffic having the same structure as the broadband traffic among subcarriers used in OFDM broadband traffic transmission are selectively offloaded in a frequency domain according to a faster-than-Nyquist (FTN) concept so as not to be used for the broadband traffic transmission, a grant-free user terminal 300 which transmits the sporadic traffic in a grant-free access scheme by mapping a subcarrier band to be used for the sporadic traffic transmission with respect to the subcarriers offloaded from the broadband user terminal 100, and a communication controller 200 which receives information about the subcarriers selectively offloaded from the broadband user terminal 100 to provide the received information to the grant-free user terminal 300.

Here, the communication controller 200 may include a configuration for transmission of the sporadic traffic as a base station for various broadband traffic transmissions (LTE, 4G, 5G, etc.) and also be simply configured for grant-free access of the sporadic traffic.

The grant-free user terminal 300 sporadically transmits and receives various types of broadband or narrowband communication traffics, for example, may be used for M2M communication such as Internet of Things (IoT) and the like, and may also perform a function of generating and transmitting the traffic and using the received traffic or simply relaying the sporadic traffic in a broadband.

As illustrated in FIG. 1, the broadband user terminal 100 according to the embodiment of the present invention includes a transmitter 110 having a subcarrier controller 115 which selectively offloads some subcarriers in a broadband traffic transmission band to be substantially used for sporadic traffic transmission and a receiver 120 for receiving broadband traffic symbols with interference occurring as a bandwidth of a signal to be transmitted in an actual time domain becomes smaller than a Nyquist bandwidth by offloading the subcarriers. Of course, the same receiver 120 may be configured even in the communication controller 200.

Meanwhile, the grant-free user terminal 300 includes a transmitter 310 having a subcarrier mapping unit 315 which maps the subcarriers offloaded from the broadband user terminal 100 for the sporadic traffic transmission and a receiver 320 for receiving the corresponding sporadic traffic.

Figure 2:
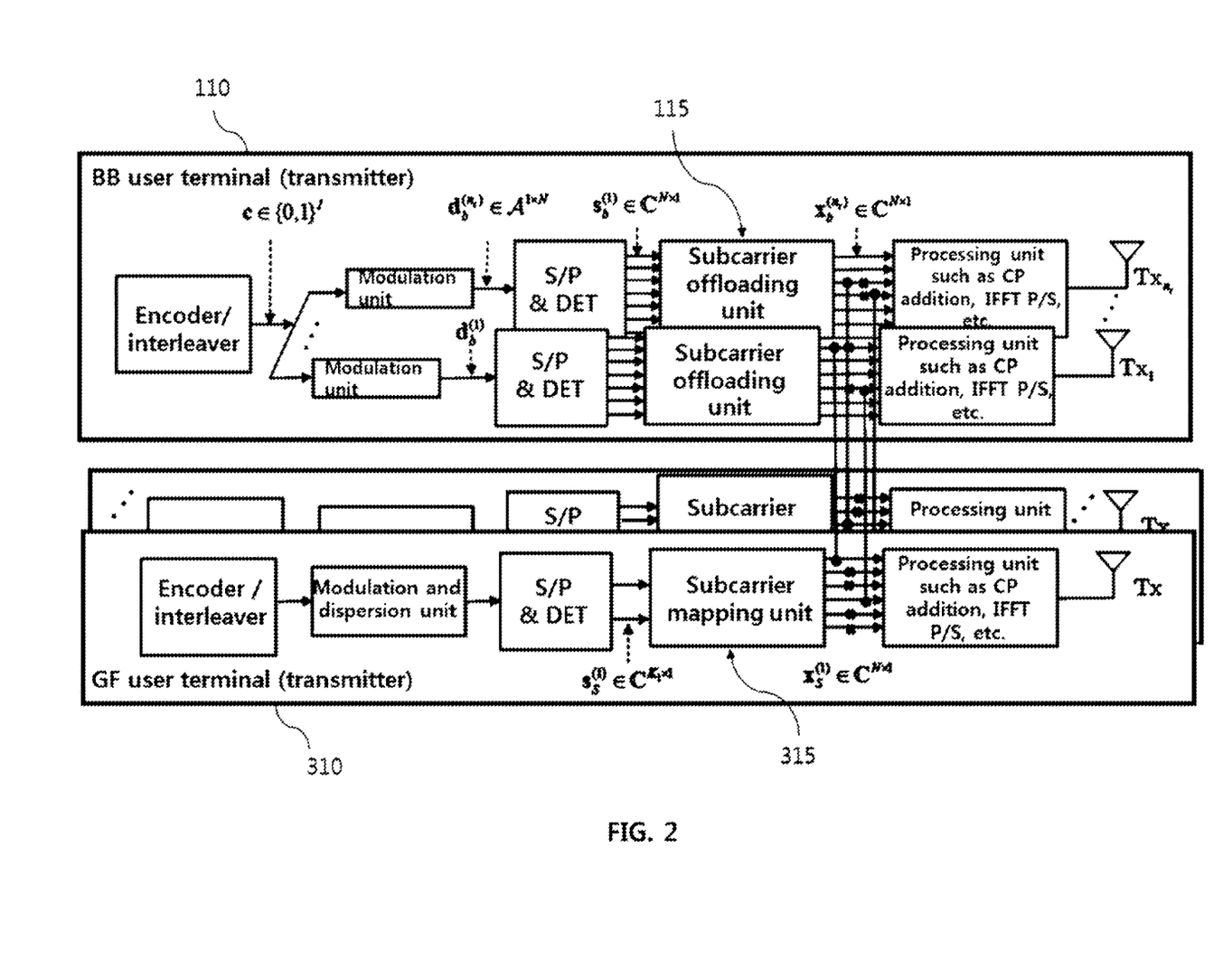
FIG. 2 is a diagram for describing a concept of offloading and mapping subcarriers, which illustrates a configuration of a transmitter of a broadband user terminal and a transmitter of a grant-free user terminal according to the embodiment of the present invention.

FIG. 2 is a diagram for describing a concept of offloading and mapping subcarriers, which illustrates a configuration of a broadband user terminal transmitter 110 and a grant-free user terminal transmitter 301 according to the embodiment of the present invention.

The illustrated broadband user terminal transmitter 110 is a multi input multi output (MIMO) OFDM receiver, and of course, the technical feature of the present invention may be applied even to a transmitter using a single antenna.

Meanwhile, the grant-free user terminal transmitter 310 has the same transmission band as the broadband, but transmits the sporadic traffic having a relatively small actual transmission data amount, and thus, a plurality of grant-free user terminals may utilize the subcarriers offloaded by a single broadband user terminal.

A specific operation principle of the present invention will be described with reference to the configuration of FIG. 2.

The present invention is intended to be superposed and transmitted to the broadband traffic transmission so that an access delay time of the sporadic traffic does not occur when the broadband traffic and the sporadic traffic coexist. The present invention has a basic feature to apply an FTN concept, not a method of allocating a fixed area or overlaying the sporadic traffic to the broadband traffic.

In a general transmission scheme, when the bandwidth is given as W (Hz), if a transmission period between consecutive symbols is T, the maximum transmission rate is given as $1/T=2$ W corresponding to a Nyquist rate. At this time, if $1/T>2$ W by the FTN, the transmission rate is high, but interference occurs between consecutive symbols and performance deterioration occurs, and thus, it is known that the transmission is impossible. However, despite such symbol interference, transmission and reception techniques for increasing the transmission speed with less bandwidth have been studied steadily. One of the techniques is to remove some frequency components before performing inverse discrete Fourier transform (DFT) for generating an OFDM signal after converting a time domain signal into a frequency domain through the DFT so that the bandwidth occupied by the time domain signal becomes smaller than the Nyquist bandwidth.

The present invention allows the sporadic traffic to be transmitted to the frequency component removed as described above based on such an FTN method and allows the frequency removed for the FTN to be most optimally removed, thereby minimizing substantial deterioration in communication quality and power consumption.

As illustrated in FIG. 2, it is assumed that the transmitter 110 of the broadband user terminal has $n_t$ transmit antennas and $n_r$ receive antennas. In addition, for convenience of description, there are B blocks having N OFDM symbols and frequency efficiency according a digital modulation method is set to M (bits/sec/Hz).

Considering the $n_t$ transmit antennas, an information stream $c=[c_1, c_2, \ldots, c_l]$ of $n_t \times B \times N \log_2 M$ bits encoded in an encoder/interleaver to be illustrated is digital-modulated in an modulation unit and then subjected to the OFDM processing, and then the spatial multiplexing is performed through each antenna.

At this time, the modulation symbol is selected from a set of $\mathcal{A} = \{\alpha_1, \ldots, \alpha_M\}$ and a b-th symbol block transmitted through a t-th antenna is denoted as $d_b^{(t)} \in \mathcal{A}^N$. In the frequency domain, N symbols in the symbol block are converted from serial to parallel in a S/P&DFT and then converted to a time domain signal $s_b^{(t)} = W d_b^{(t)}$ by an inverse DFT matrix (here, $s_b^{(t)} = [S_b^{(t)}[1], S_b^{(t)}[2], \ldots, S_b^{(t)}[N]$).

It is assumed that a set of indices representing subcarriers actually used N subcarrier sets usable in the t-th antenna of the broadband user terminal transmitter 110 is $\mathcal{K}^{(t)} \subseteq \{1, 2, \ldots, N\}$. Accordingly, the set of the indexes representing the subcarriers which are not used and offloaded among the N subcarriers is given as $\overline{\mathcal{K}}^{(t)} = \{1, 2, \ldots, N\} \setminus \mathcal{K}$, and in the present invention, these subcarriers are allocated to the sporadic traffic.

In this case, the number of subcarriers offloaded for each antenna is denoted as $K_t = |\overline{\mathcal{K}}^{(t)}|$. Accordingly, when the b-th OFDM symbol transmitted through the subcarriers belonging to $\overline{\mathcal{K}}^{(t)}$ and $\overline{\mathcal{K}}^{(t)} = \{1, 2, \ldots, N\} \setminus \mathcal{K}$ in the t-th antenna is $x_b^{(t)}$, a k-th symbol of $x_b^{(t)}$ may be represented by Equation 1 as follows.

$$X_b^{(t)}[k] = \begin{cases} S_b^{(t)}[k] & \text{if } k \in \mathcal{K}^{(t)} \\ 0 & \text{if } k \in \overline{\mathcal{K}}^{(t)} \end{cases} \quad \text{[Equation 1]}$$

For simple description, the index t representing a specific antenna is omitted and a vector configured by collecting OFDM symbols transmitted by a k-th subcarrier of the b-th symbol block transmitted through all antennas is denoted as $x_{b,k}' = [X_{b,k}'[1], X_{b,k}'[2], \ldots, X_{b,k}'[n_t]]^T$ (here, the t-h component is $X_{b,k}'[t] \triangleq X_b^{(t)}[k]$, as a symbol transmitted to the t-th antenna).

Meanwhile, like the illustrated grant-free user terminal transmitter 310, the sporadic traffic is transmitted in the same structure as the broadband traffic, and at this time, the frequency domain symbol of the sporadic traffic is allocated to the subcarrier offloaded from the broadband traffic through the subcarrier mapping. In this case, when a frequency domain symbol of the sporadic traffic is transmitted through the k-th subcarrier of the t-th antenna, the frequency domain symbol is represented as $D_{S,k}[t]$.

The k-th subcarriers transmitted through all antennas may be represented as one vector $x_{S,k} \in \mathbb{C}^{n_t \times 1}$, (here, $x_{S,k} = [X_{s,k}[1], X_{s,k}[2], \ldots, X_{s,k}[n_t]]$. In this case, each component of $x_{S,k} \in \mathbb{C}^{n_t \times 1}$ is determined by whether the frequency domain symbol of the sporadic traffic in the t-th antenna is transmitted to any subcarrier (offloaded subcarrier) of the broadband traffic. That is, since the sporadic traffic is not allocated with respect to non-offloaded subcarriers of the broadband traffic, $X_{S,k}[t]=0$, and if the sporadic traffic is allocated to the k-th subcarrier, $X_{S,k}[t]=D_{S,k}[t]$.

A k-th subcarrier component of the OFDM signal corresponding to the b-th symbol block received from the r-th antenna is denoted as $Y_{b,k}[r]$. At this time, if the vector of the signal received from all the antennas is denoted as $y_{b,k} = [Y_{b,k}[1], Y_{b,k}[2], \ldots, Y_{b,k}[n_r]]^T$, this is as Equation 2 below.

$$y_{b,k} = H_{b,k} x_{b,k}' + H_{S,k} x_{S,k} + \omega_{b,k}, k=1,2,\ldots,N \quad \text{[Equation 2]}$$

In Equation 2, $H_{b,k} \in \mathbb{C}^{n_r \times n_t}$ and $H_{S,k} \in \mathbb{C}^{n_r \times n_t}$ are matrixes representing channels undergone by the k-th subcarrier signal of the broadband user terminal transmitter and the grant-free user terminal transmitter for the sporadic traffic, respectively, and $\omega_{b,k} \in \mathbb{C}^{n_r \times 1}$ is an additive Gaussian noise vector in the frequency domain. In Equation 2, each component of the received vector is given as $Y_{b,k}[r] = H_{b,k}[r,t] X_{b,k}'[t] + H_{S,k}[r,t] X_{S,k}[t] + w_{b,k}[r]$.

Figure 3:
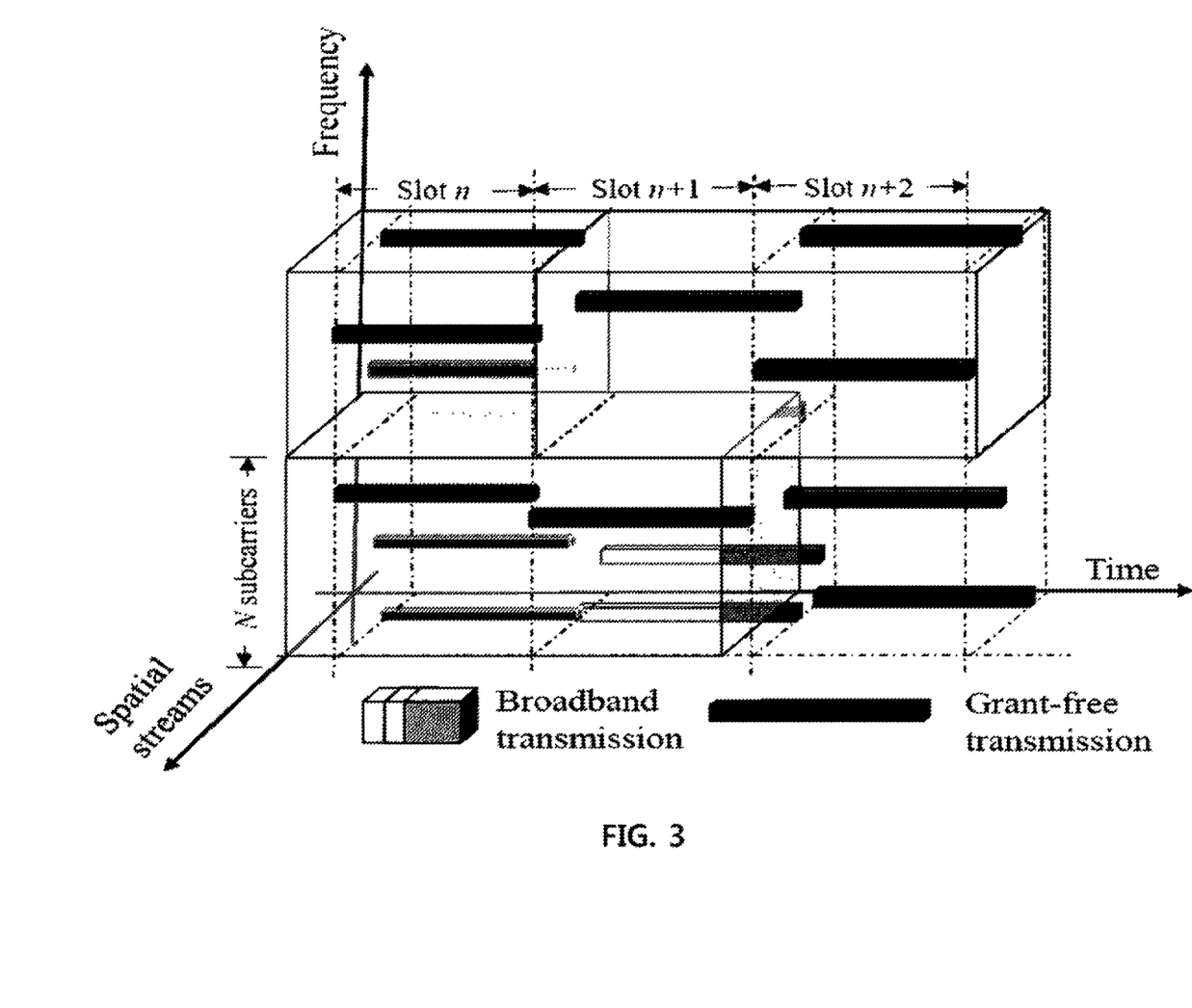
FIG. 3 is a conceptual diagram illustrating a concept for offloading and mapping 3D subcarriers by considering offloading of a subcarrier for each antenna according to the embodiment of the present invention.

Meanwhile, like as if the broadband user terminal transmitter offloads the specific subcarrier, the extension to a concept of offloading a specific subcarrier for each antenna is possible. That is, as illustrated in FIG. 3, subcarriers transmitted to a specific antenna are offloaded for each antenna and thus 3D subcarrier offloading may be considered over time. For example, in an MIMO system of $n_t = n_r = 8$, when two antennas are removed with respect to the k-th subcarrier, channels of the broadband user terminal transmitter 110 and the grant-free user terminal transmitter 310 for the sporadic traffic are given as $H_{b,k} = [h_{b,k}^{(1)} h_{b,k}^{(2)} \ldots h_{b,k}^{(6)} 0\, 0]$ and $H_{S,k} = [0\, 0 \ldots 0 h_{S,k}^{(7)} h_{S,k}^{(8)}]$, respectively. Here, $h_{S,k}^{(7)} \in \mathbb{C}^{n_r \times 1}$ and $h_{S,k}^{(8)} \in \mathbb{C}^{n_r \times 1}$ are channel vectors corresponding to the k-th subcarrier of the grant-free user terminal transmitter 310 for the sporadic traffic. Similarly, the frequency domain transmission symbols of the respective terminal transmitters of the broadband traffic and the sporadic traffic are given as $x_{b,k}' = [X_{b,k}'[1] X_{b,k}'[2] \ldots 0\, 0]^T$ and $X_{S,k} = [0\, 0 \ldots x_{S,k}[7] x_{S,k}[8]]^T$, respectively.

Equation 2 can be combined in a simpler form as follows if defined as $H_{b,k}'' = H_{b,k}' + H_{S,k}$ and $x_{b,k}'' = x_{b,k}' + x_{S,k}$.

$$y_{b,k} = H_{b,k}'' x_{b,k}'' + \omega_{b,k}, k=1,2,\ldots,N \quad \text{[Equation 3]}$$

Meanwhile, in the present invention, as such, since some subcarriers are offloaded from the broadband traffic, even though the reduction in the transmission amount may be partially compensated by the application of FTN, there is a limitation to decrease substantial efficiency reduction. Accordingly, in the present invention, a method of efficiently selecting subcarriers to be offloaded instead of randomly selecting subcarriers to be offloaded is applied.

In the present invention, a method of preferentially offloading subcarriers which do not contribute most to the broadband traffic transmission is used, and hereinafter, a channel gain-based subcarrier offloading method described through FIGS. 4 and 5 and a channel matrix-based subcarrier offloading method described through FIGS. 6 and 7 may be used. This may be performed in the subcarrier offloading unit 115 of the broadband user terminal transmitter.

If all $$N_{GF} = \sum_{t=1}^{n_t} |\overline{\mathcal{K}}^{(t)}|$$

subcarriers are offloaded ($N_{GF}$ may be determined in response to an amount of the sporadic traffic by a sporadic traffic managing unit 210), performance deterioration is expected when the consecutive subcarriers are offloaded, and thus, if possible, the subcarriers to be offloaded are selected at regular intervals. To this end, the subcarrier offloading unit divides subcarriers (N) of a set to be used in the broadband traffic transmission into a plurality of subsets, and an I-th subset is $\tilde{K}_y^{(\ell)} = \{(\ell-1)L+1, (\ell-1)L+2 \ldots, \ell L\}$, $\ell = 1, 2 \ldots$ N/L and has L subcarrier indices. That is, each subset includes N/L subcarriers. Meanwhile, the subcarrier offloading unit may adjust a process of setting subsets or selecting subcarriers to be offloaded so as to have at least a minimum interval between the offloaded subcarriers so that the offloaded subcarriers are not adjacent to each other.

Figure 4:
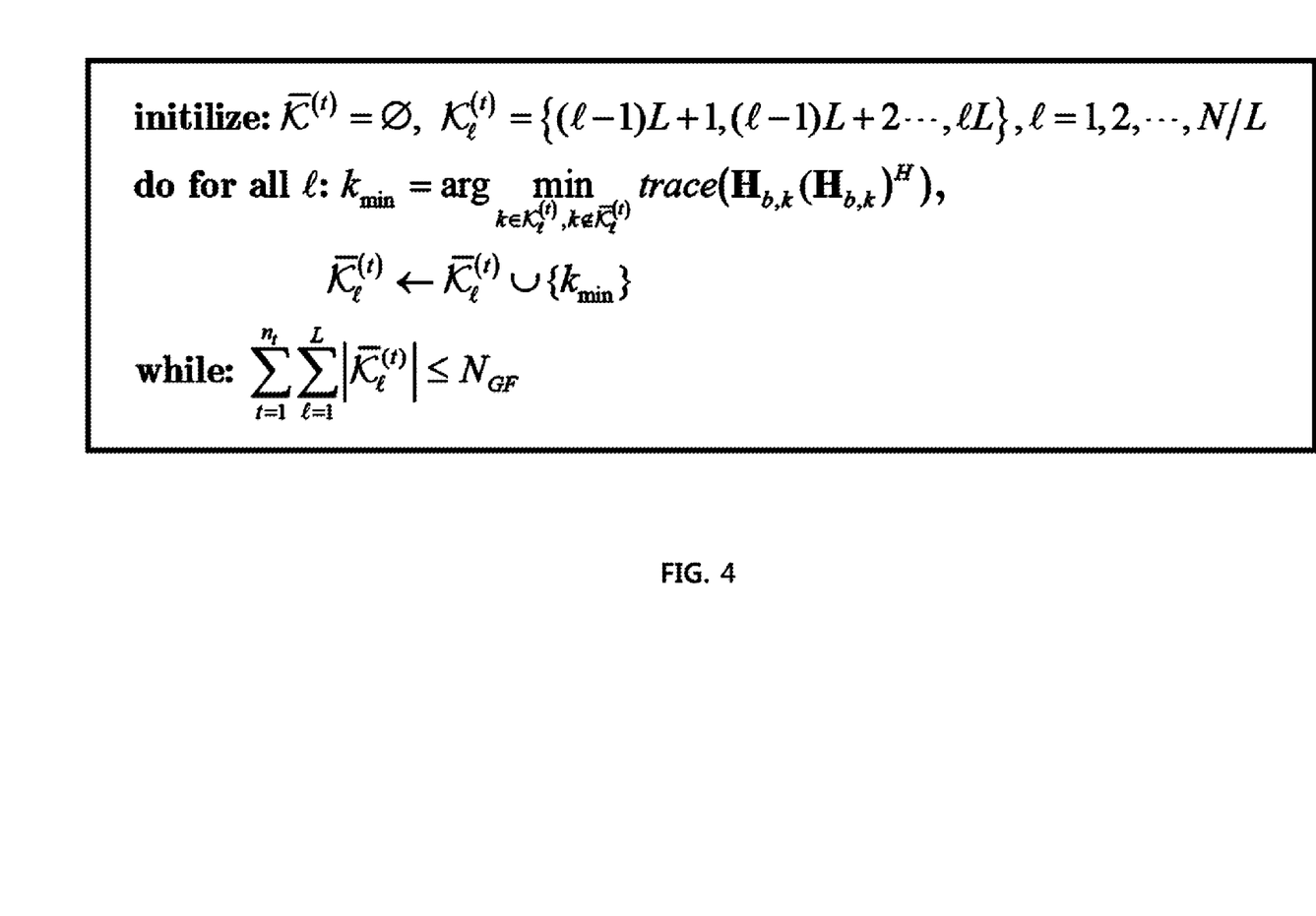
FIG. 4 illustrates a pseudo code for describing a method of offloading subcarriers according to an embodiment of the present invention.
Figure 5:
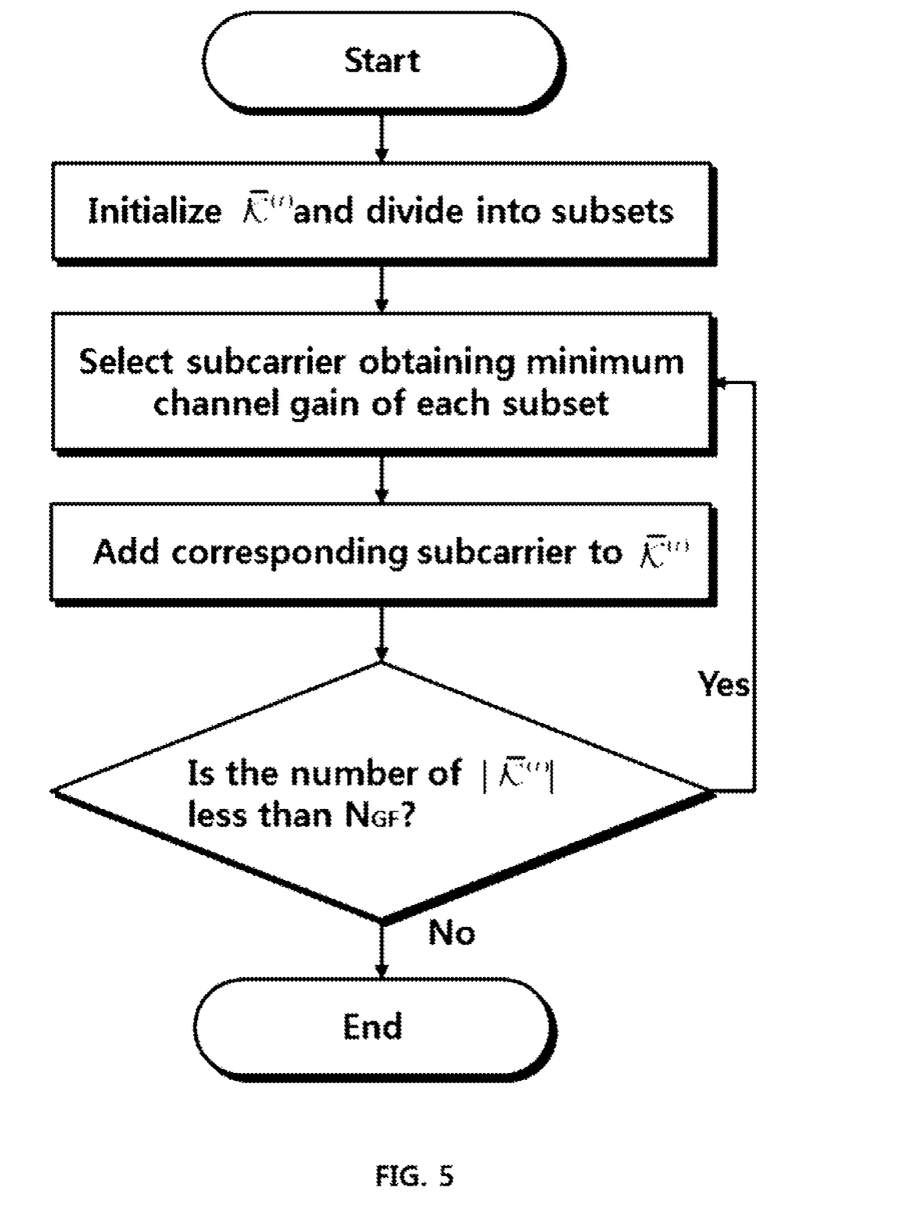
FIG. 5 is a flowchart describing an operation method of the pseudo code of FIG. 4.

First, FIG. 4 illustrates a pseudo code showing a method of offloading subcarriers in the order of smallest combined channel gain in a spatial multiplexing process and FIG. 5 illustrates a flowchart thereof.

As illustrated in FIGS. 4 and 5, first, a channel set $\tilde{K}_y^{(\ell)}$ to be removed is initialized and subcarriers to be used in the broadband traffic transmission are divided into a plurality of subsets.

Thereafter, a subcarrier for obtaining a minimum channel gain of each subset is obtained through trace($H_{b,k}(H_{b,k})^H$) and selected as a subcarrier to be offloaded to be added to a channel set $\tilde{K}_y^{(\ell)}$ to be removed, and this process is repeated so that the number of selected subcarriers reaches a predetermined subcarrier offloading quantity ($N_{GF}$).

Figure 6:
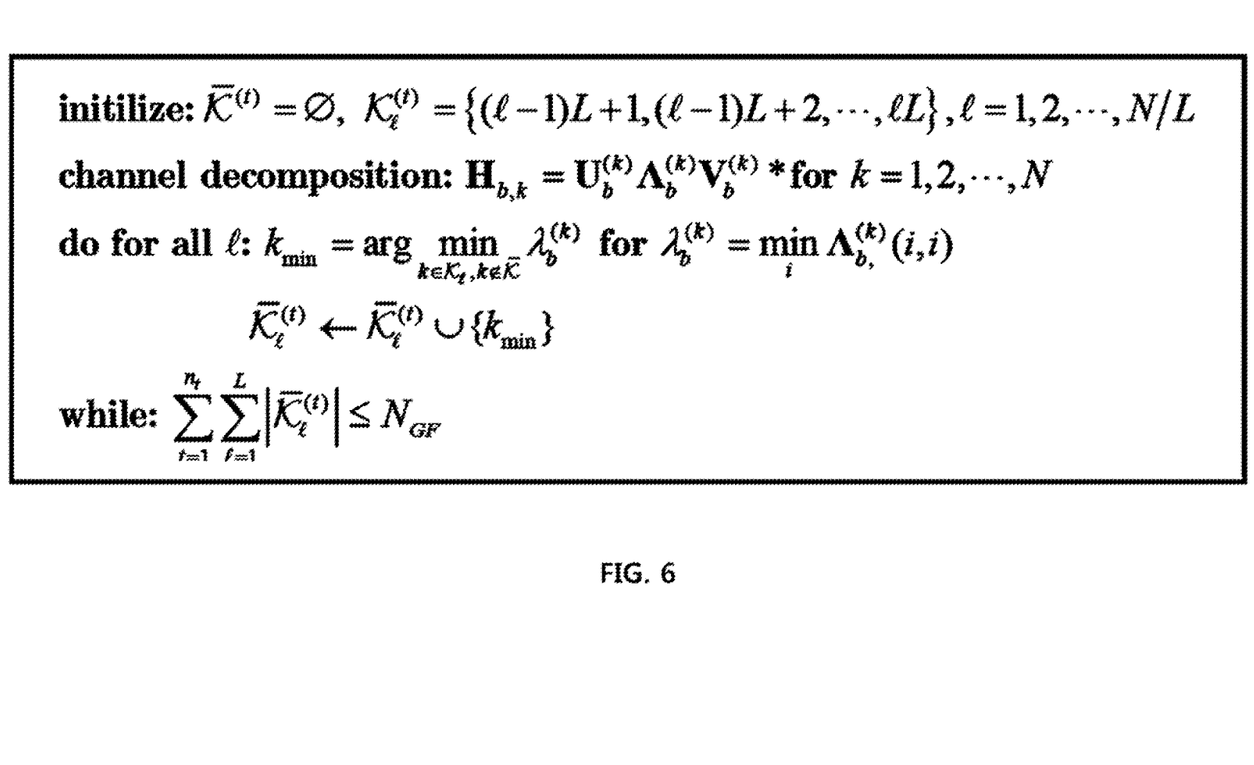
FIG. 6 is a pseudo code for describing a method of offloading subcarriers according to another embodiment of the present invention.
Figure 7:
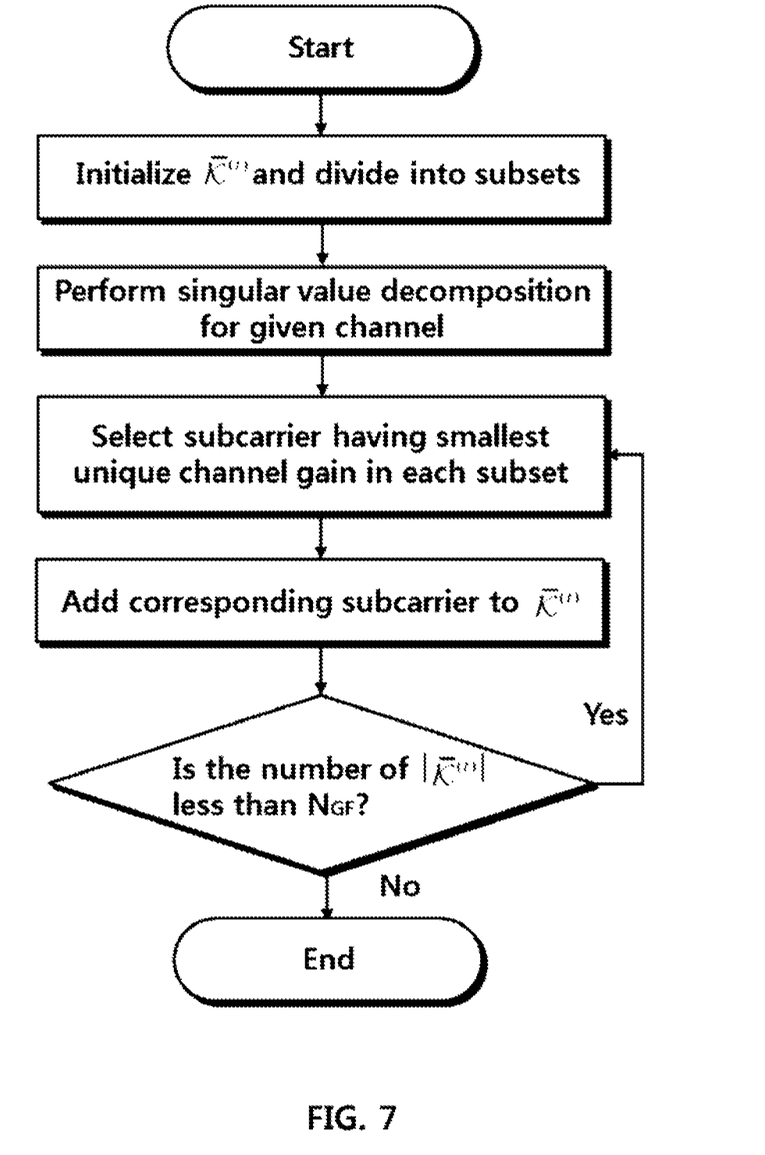
FIG. 7 is a flowchart describing an operation method of the pseudo code of FIG. 6.

FIG. 6 illustrates a pseudo code showing a method of providing a subcarrier corresponding to a channel having the smallest singular value in terms of spatial multiplexing and FIG. 7 illustrates a flowchart thereof.

As illustrated in FIGS. 6 and 7, first, a channel set $\tilde{K}_y^{(\ell)}$ to be removed is initialized and subcarriers to be used in the broadband traffic transmission are divided into a plurality of subsets. In addition, with respect to a $H_{b,k}$ channel, singular value decomposition (SVD) is performed.

$H_{b,k} = U_b^{(k)} \Lambda_b^{(k)} V_b^{(k)*}$ for k=1, 2, . . . , N As such, in the case of singular value decomposition of a channel matrix H (n×n), U is a n×n unitary matrix, ^ is a n×n diagonal matrix, in which diagonal components represent specific values of H, and V is a n×n unitary matrix.

Thereafter, subcarriers having the smallest unique channel gain are selected in each subset and added to a channel sets $\tilde{K}_y^{(\ell)}$ to be removed, and this process is repeated so that the number of selected subcarriers reaches a predetermined subcarrier offloading quantity ($N_{GF}$).

As such, the subcarrier offloading unit 115 of the present invention selectively offloads subcarriers which do not substantially contribute to the broadband traffic transmission so as not to be adjacent to each other through the method illustrated in FIGS. 4 and 5 to minimize reduction of transmission efficiency even if the FTN scheme is applied. Meanwhile, information about the selected subcarriers to be offloaded may be transmitted to the grant-free user terminals 300 through the communication controller 200 and the subcarrier mapping unit 315 selects desired subcarriers in a contention manner to transmit the sporadic traffic.

Figure 8:
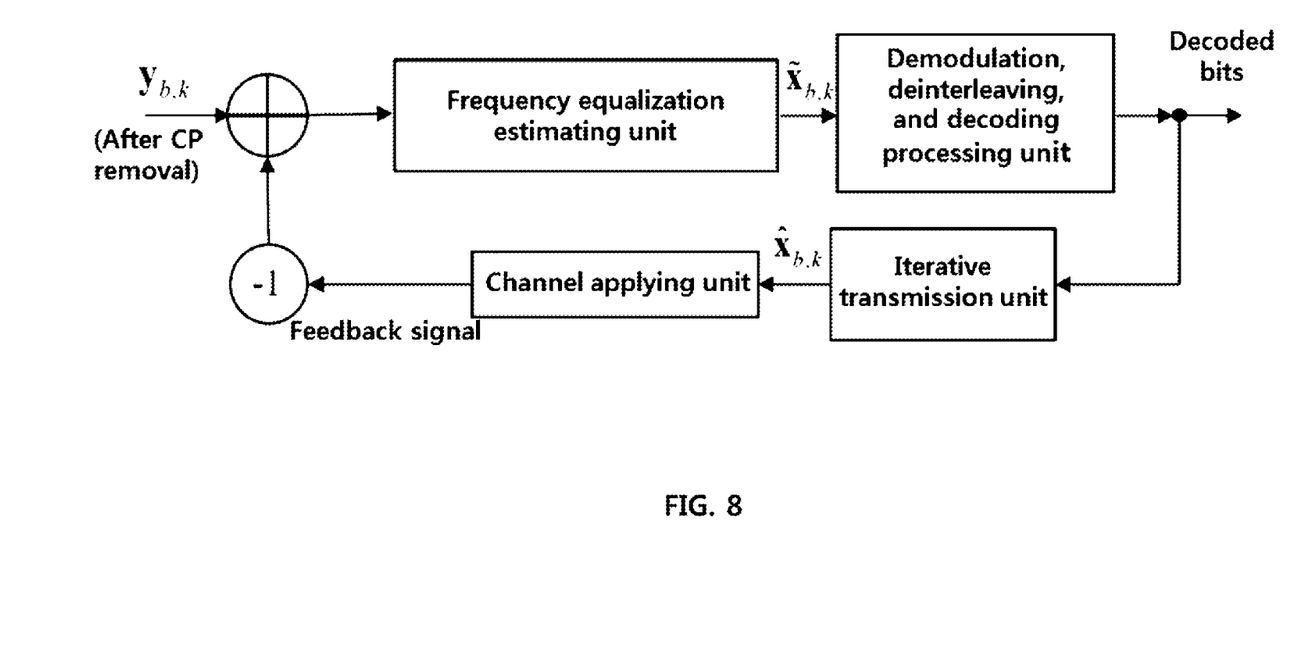
FIG. 8 is a block diagram illustrating a configuration of a broadband traffic receiver according to an embodiment of the present invention.

Meanwhile, since the broadband traffic transmitted by the broadband user terminal transmitter 110 is narrower in bandwidth than the transmission amount (FTN application), inter-symbol interference occurs, and the receiver 120 of the broadband user terminal 100 or the communication controller 200 to receive the FTN type broadband traffic receives the received symbols in an estimation manner through An iterative receiver as illustrated in FIG. 8.

FIG. 8 is a block diagram illustrating a configuration of a broadband traffic receiver 320 according to an embodiment of the present invention. As illustrated in FIG. 8, an estimated value $\tilde{x}_{b,k}$ for $x_{b,k}''$ of Equation 3 may be calculated by applying a frequency-domain equalizer (FDE).

$$\tilde{x}_{b,k} = (H_{b,k}')^\dagger (y_{b,k} - H_{b,k}' \hat{x}_{b,k}) + \hat{x}_{b,k} \quad [\text{Equation 4}]$$

Here, $(H_{b,k}')^\dagger$ is a Moore-Penrose pseudo-inverse matrix of $H_{b,k}'$ and $(H_{b,k}')^\dagger = (H_{b,k}'(H_{b,k}')^H)^{-1} H_{b,k}'$. At this time, $\hat{x}_{b,k} = 0_{n_t}$ is used as an initial estimated value and as illustrated in FIG. 8, detection and decoding are performed using an estimated soft value $\tilde{x}_{b,k}$.

With respect to the decoded bits, $\hat{x}_{b,k}$ is restored by performing the procedure of the transmitting process again and then the channel is applied, and $\tilde{x}_{b,k}$ is updated again through Equation 4. This process is repeated by a predetermined number (Imax) to decode bits through the $\tilde{x}_{b,k}$ value.

Instead of the FDE applied herein, a single input single output (SISO) equalizer for calculating a log-likelihood ratio (LLR) may be applied by a bit unit of each symbol.

Hereinafter, performance in the case of using the embodiment of the present invention will be described with reference to FIGS. 9 to 11.

Figure 9:
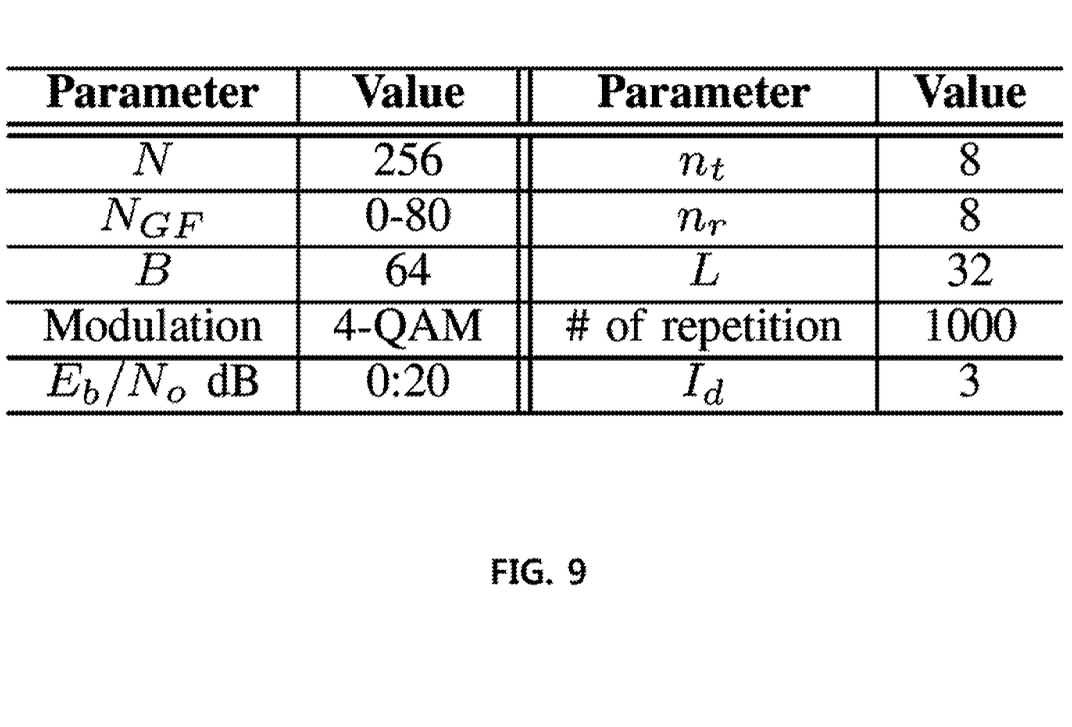
FIG. 9 is a parameter table for testing the performance of an apparatus according to an embodiment of the present invention.

First, FIG. 9 illustrates simulation parameters, and as illustrated in FIG. 9, an object for simulation is considered as a MIMO-OFDM system using 8 antennas at each of transmitting and receiving ends and using N=256 subcarriers for a broadband traffic user. While $N_{GF}$ subcarriers are offloaded from a total of 256 subcarriers, the performance will be described.

To describe the performance of the system, a multipath channel model that undergoes independent rayleigh fading for each path is applied. In addition, when the power density is influenced by the additive noise of No and the energy per bit is Eb, the performance according to Eb/No is confirmed.

In addition, a convolutional code with a coding rate of R=½ is applied and bit interleaving is applied. As illustrated in FIGS. 10 and 11, simulation results are obtained by applying the reception structure considered in the present invention to B=64 OFDM symbol blocks.

Figure 10:
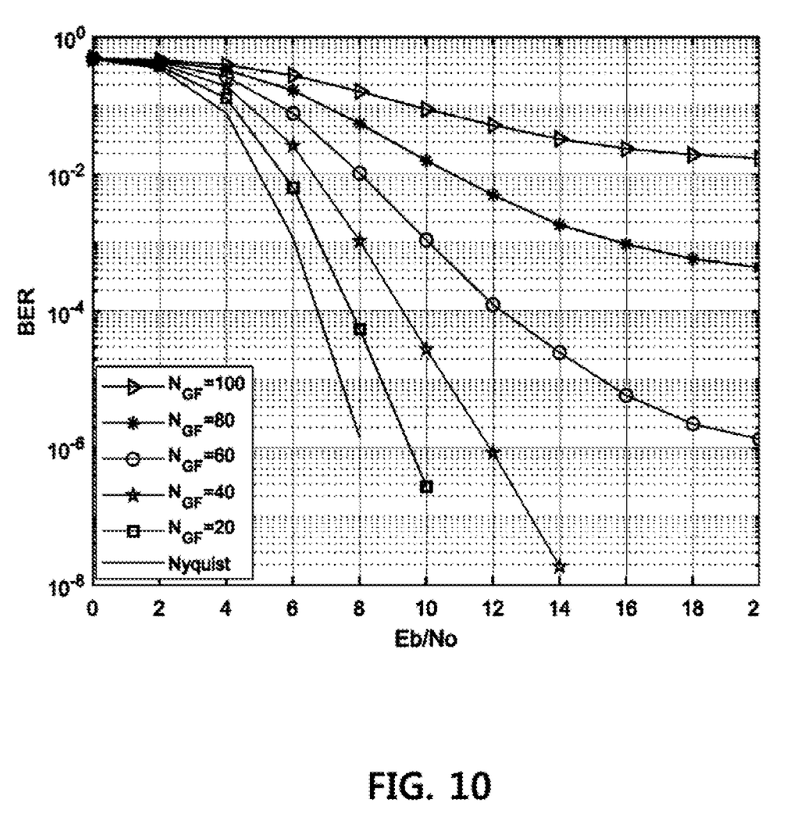
FIGS. 10 and 11 are graphs showing experimental data for evaluating the performance of the apparatus according to the embodiment of the present invention.

FIG. 10 illustrates bit error performance of the broadband traffic user terminal according to the number of subcarriers used for the sporadic traffic transmission. As illustrated in FIG. 10, performance deterioration occurs when the number $N_{GF}$ of subcarriers to be offloaded increases, but when the number is sufficiently small, it can be seen that an appropriate range of performance may be secured.

Figure 11:
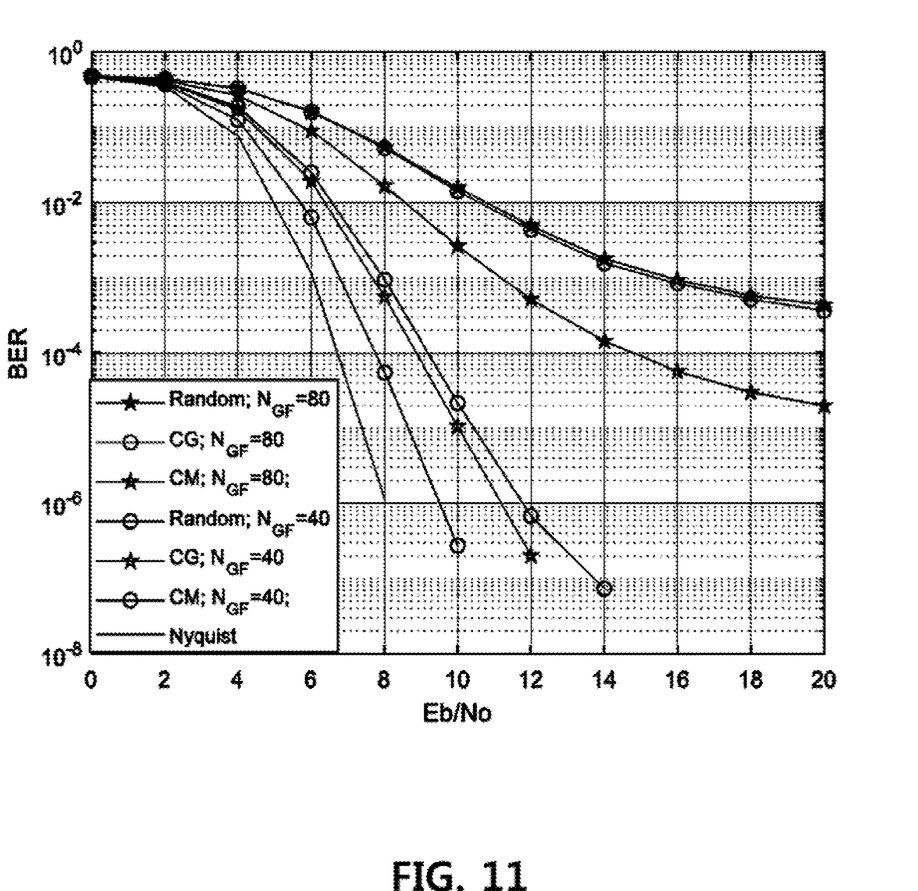

FIG. 11 illustrates the performance according to the subcarrier offloading method. The performance of the subcarrier offloading method described through FIGS. 4 and 6 and the performance when the subcarriers are offloaded at random are compared with each other for each $N_{GF}$ value. As illustrated in FIG. 11, it can be seen that the channel gain-based subcarrier offloading method shows a slight improvement effect in performance compared to the random case, but the channel matrix (CM) based subcarrier offloading method shows much better performance. That is, when the FTN method is applied while offloading the subcarriers in the same manner as the embodiment of the present invention, the same radio resources may be utilized most effectively.

On the other hand, these performances may be further improved by the detailed receiving method, the subcarrier offloading method, and the like to be applied.

The aforementioned contents can be corrected and modified by those skilled in the art without departing from the essential characteristics of the present invention. Accordingly, the various embodiments disclosed herein are not intended to limit the technical spirit but describe with the true scope and spirit being indicated by the following claims. The protection scope of the present invention should be construed based on the following appended claims and it should be appreciated that the technical spirit included within the scope equivalent to the claims belongs to the present invention.

What is claimed is:

1. A FTN-based Orthogonal Frequency Division Multiplexing (OFDM) transmission apparatus for efficient coexistence of broadband and sporadic traffics comprising:
   a broadband user terminal configured to
   selectively offload subcarriers to be allocated to the sporadic traffic having the same structure as the broadband traffic among subcarriers used for broadband traffic transmission in a frequency domain according to a faster-than-Nyquist (FTN) concept by means of uplink terminals in a mobile communication system and then not use the offloaded subcarriers for the broadband traffic transmission;
   a grant-free user terminal configured to
   map a subcarrier band to be used for sporadic traffic transmission to the subcarriers offloaded by broadband user terminal and
   transmit the sporadic traffic in a grant-free access method; and
   a communication controller configured to
   receive information about the selectively offloaded subcarrier from the broadband user terminal to provide the received information to the grant-free user terminal.

2. The FTN-based OFDM transmission apparatus of claim 1, wherein the communication controller
   provides the number of subcarriers to be offloaded according to an amount of sporadic traffic by the grant-free user terminals to the broadband user terminal and
   receive information about the selectively offloaded subcarriers corresponding to the number from the broadband user terminal to provide the received information to the grant-free user terminal.

3. The FTN-based OFDM transmission apparatus of claim 1, wherein the broadband user terminal includes a subcarrier offloading unit configured to preferentially offload subcarriers having the lowest contribution to the broadband transmission among the subcarriers allocated to the broadband traffic transmission in order to offload subcarriers to be allocated to the sporadic traffic.

4. The FTN-based OFDM transmission apparatus of claim 3, wherein the subcarrier offloading unit
   divides subcarriers to be used for the broadband traffic transmission into a plurality of subsets, and
   repeats a process of selecting and preferentially offloading a subcarrier obtaining a minimum channel gain or having the smallest unique channel gain to reach a predetermined subcarrier offloading number.

5. The FTN-based OFDM transmission apparatus of claim 4, wherein the subcarrier offloading unit allows the subcarriers to be offloaded at minimum intervals so the subcarriers to be offloaded are not adjacent to each other.

6. The FTN-based OFDM transmission apparatus of claim 4, wherein the subcarrier offloading unit
   divides subcarriers to be used for the broadband traffic transmission into a plurality of subsets,
   performs singular value decomposition for the given channel, and then
   repeats a process of offloading subcarriers collecting information about the offloaded subcarriers in all subsets until the number of offloaded subcarriers reaches a desired number while performing the process of offloading the subcarriers having the smallest unique channel gain from each subset, and
   provides information about the offloaded subcarriers collected through the process to the communication controller.

7. The FTN-based OFDM transmission apparatus of claim 1, wherein the broadband user terminal includes a multi input multi output (MIMO) type transmitter and configures a subcarrier offloading unit for each antenna when performing spatial multiplexing for multiple antennas to selectively offload the subcarrier for each antenna.

8. The FTN-based OFDM transmission apparatus of claim 1, wherein the broadband user terminal or the communication controller which performs broadband communication with the broadband user terminal includes
   a receiver applied with a frequency-domain equalizer (FDE) detecting symbols of the broadband traffic user terminal for receiving the broadband traffic transmitted by the FTN method in which some subcarriers are offloaded or a Single-Input-Single-Output (SISO) equalizer calculating a log-likelihood ratio (LLR) by each symbol bit unit.

9. A FTN-based Orthogonal Frequency Division Multiplexing (OFDM) transmission method for efficient coexistence of broadband and sporadic traffics comprising:
   a subcarrier offloading step of selectively offload subcarriers to be allocated to the sporadic traffic having the same structure as the broadband traffic among subcarriers used for broadband traffic transmission in a frequency domain according to a faster-than-Nyquist (FTN) concept in a mobile communication system and then not use the offloaded subcarriers for the broadband traffic transmission by means of a broadband user terminal;
   mapping a subcarrier band to be used for sporadic traffic transmission to the subcarriers offloaded by broadband user terminal and transmitting the sporadic traffic in a grant-free access method by means of a grant-free user terminal; and
   receiving information about the subcarrier selectively offloaded from the broadband user terminal to provide the received information to the grant-free user terminal by means of a communication controller.

10. The FTN-based OFDM transmission method of claim 9, wherein the controlling step includes
    providing, by means of the communication controller, the number of subcarriers to be offloaded according to an amount of sporadic traffic by the grant-free user terminals to the broadband user terminal and
    receiving information about the selectively offloaded subcarriers corresponding to the number from the broadband user terminal to provide the received information to the grant-free user terminal.

11. The FTN-based OFDM transmission method of claim 9, wherein the subcarrier offloading step includes preferentially offloading subcarriers having the lowest contribution to the broadband transmission among the subcarriers allocated to the broadband traffic transmission in order to offload subcarriers to be allocated to the sporadic traffic.

12. The FTN-based OFDM transmission method of claim 11, wherein the subcarrier offloading step includes dividing subcarriers to be used for the broadband traffic transmission into a plurality of subsets, and repeating a process of selecting and preferentially offloading a subcarrier obtaining a minimum channel gain or having the smallest unique channel gain to reach a predetermined subcarrier offloading number.

13. The FTN-based OFDM transmission method of claim 11, wherein the subcarrier offloading step includes allowing the subcarriers to be offloaded at minimum intervals so the subcarriers to be offloaded are not adjacent to each other.

14. The FTN-based OFDM transmission method of claim 11, wherein the subcarrier offloading step includes dividing subcarriers to be used for the broadband traffic transmission into a plurality of subsets, performing singular value decomposition for the given channel, and then repeating a process of offloading subcarriers collecting information about the offloaded subcarriers in all subsets until the number of offloaded subcarriers reaches a desired number while performing the process of offloading the subcarriers having the smallest unique channel gain from each subset, and providing information about the offloaded subcarriers collected through the process to the communication controller.

15. The FTN-based OFDM transmission method of claim 9, wherein the broadband user terminal includes a multi input multi output (MIMO) type transmitter and configures a subcarrier offloading unit for each antenna when performing spatial multiplexing for multiple antennas to selectively offload the subcarrier for each antenna.

16. The FTN-based OFDM transmission apparatus of claim 9, further comprising: by means of a receiver of the broadband user terminal or the communication controller which performs broadband communication with the broadband user terminal, receiving the broadband traffic transmitted by the FTN method in which some subcarriers are offloaded by applying a frequency-domain equalizer (FDE) to detect symbols of the broadband traffic user terminal and a Single-Input-Single-Output (SISO) equalizer calculating a log-likelihood ratio (LLR) by each symbol bit unit.

* * * * *